United States Patent [19]

Wasylyshyn

[11] Patent Number: 4,904,147
[45] Date of Patent: * Feb. 27, 1990

[54] LOAD CARRYING APPARATUS

[75] Inventor: Mike Wasylyshyn, Kamloops, Canada

[73] Assignee: Miro Enterprises, Kamloops, Canada

[*] Notice: The portion of the term of this patent subsequent to Feb. 28, 2006 has been disclaimed.

[21] Appl. No.: 283,290

[22] Filed: Dec. 12, 1988

Related U.S. Application Data

[63] Continuation of Ser. No. 509,312, Jun. 30, 1983, Pat. No. 4,808,060.

[30] Foreign Application Priority Data

Jul. 13, 1982 [CA] Canada .................................. 407120

[51] Int. Cl.$^4$ ................................................ B66B 9/20
[52] U.S. Cl. .................................. 414/608; 108/52.1; 414/785
[58] Field of Search .............. 414/608, 785; 105/51.1, 105/52.1, 56.1, 57.1

[56] References Cited

U.S. PATENT DOCUMENTS

| 2,388,458 | 11/1945 | Alfonte | 414/608 X |
| 2,436,554 | 2/1948 | Cruickshank | 108/57.1 |
| 2,468,026 | 4/1949 | Boone | 108/57.1 |
| 2,498,504 | 2/1950 | Quayle | 414/785 |
| 2,503,022 | 4/1950 | Benoist et al. | 108/51.1 |
| 2,818,989 | 1/1958 | Burke | 414/608 |
| 2,922,606 | 1/1960 | Glassman et al. | 108/56.1 |
| 3,207,096 | 9/1965 | Munroe | 108/51.1 |
| 3,251,322 | 5/1966 | Downs et al. | 108/51.1 |
| 4,043,472 | 8/1977 | Hoyt | 414/785 |
| 4,808,060 | 2/1989 | Wasylyshyn | 414/608 |

FOREIGN PATENT DOCUMENTS

| 467796 | 8/1950 | Canada | 414/608 |
| 619394 | 5/1961 | Canada | 108/51.1 |
| 1182079 | 11/1964 | Fed. Rep. of Germany | 414/608 |
| 2057808 | 12/1979 | Fed. Rep. of Germany | 108/51.1 |
| 291343 | 6/1965 | Netherlands | 108/52.1 |
| 318342 | 12/1956 | Switzerland | 414/608 |
| 1262928 | 2/1972 | United Kingdom | 108/57.1 |

OTHER PUBLICATIONS

"Pallet Buyers and Engineers Guide" of the Pallet Sales Corp., 1948, pp. 2 and 9.

Primary Examiner—David A. Bucci
Attorney, Agent, or Firm—Spensley Horn Jubas & Lubitz

[57] ABSTRACT

Apparatus for transporting a load by a vehicle having lifting forks reduced in length to combine with a rectangular pallet having side and end edges. The pallet has transversely extending floor boards and longitudinally extending stringers separated by spacer blocks with a deck of transversely extending boards mounted on the stringers. The assembly provides transverse channels into which the forks can be entered from either side edge to pick up the loaded pallet, and also provides longitudinal channels for receiving the forks entered from either end edge. By reducing the effective length of standard forks, the outer ends of the forks are prevented from the projecting from the remote side edge of the pallet when the forks are fully entered into the transverse channels. The length of the pallet plus the arrangement of the floor boards place the outer ends of the lifting forks clear of the outermost floor board when the forks are fully entered into the longitudinal channels. For a vehicle with standard lifting forks fitted with wheels, the forks are shortened to the required length and the wheels are shifted to a position locating the foremost edge of the wheels close to the overhanging outer ends of the forks and the wheels are positioned between floor boards when the forks are fully entered into the longitudinal channels. A framework is attachable to a vehicle fitted with lifting forks of standard length to obtain the same result as removing a portion of the forks to reduce the effective length.

4 Claims, 2 Drawing Sheets

4,904,147

LOAD CARRYING APPARATUS

This is a continuation of application Ser. No. 509,312, filed on June 30, 1983, now U.S. Pat. No. 4,808,060.

FIELD OF THE INVENTION

This invention relates generally to apparatus for supporting and transporting loads and more particularly to an improved pallet ideally suited for use as a beer skid.

DESCRIPTION OF THE PRIOR ART

Most breweries ship their products to distributors in kegs, or in bottles packed in cardboard cases for protection against breakage and for convenience in carrying. The beer usually is transported by road or rail with the cases stacked on pallets or skids as they are referred to in the industry and the task of loading and unloading the trucks and railroad cars presents special problems. It is common practice to stack the barrels or cases of beer on the pallets and to shift the stacked pallets about using one of the many types of forklift vehicles which are available for this purpose. The rectangular pallets generally are of a standard 40 inches by 48 inches size and the lifting forks are made 48 inches long so that they can lift the pallet from the narrow ends as well as from the slightly longer sides of the load supporting structure. Since the forks are commonly used to pick up the loaded pallet by being entered beneath one of its relatively long side edges, the tips of the forks often are allowed to project a short distance at least from the opposite side edge. This projection of the fork ends makes it extremely difficult to pack the pallets side by side in a confined space without causing damage usually to the adjacent pallet. Normally, the rectangular pallets are made of wood and the boards which make up the load supporting deck of the structure, as well as the transversely spaced boards which have contact with the floor, all extend longitudinally from end edge to end edge. As a result, there are floor and deck boards at each side edge which are easily broken or splintered when the tips of the lifting forks project beyond the pallet. If care is taken to locate the pallet on the ends of the forks so there is no projection, the result is that a space or void exists between the inner side edge of the pallet and the upright usually provided on the vehicle at the inner ends of the forks. The load on the forks then is unstable and can shift which is undesirable. The deck and floor boards of a conventional pallet must necessarily be supported by underlying members or stringers which extend transversely of the structure that is, from side edge to side edge, and this is a serious disadvantage as well. An unevenly loaded pallet, for example, when picked up by lifting forks entered from a narrow end edge is inclined to distort the extreme ends of the floor boards so that the pallet arches upwardly or is otherwise distorted and is dangerously unstable once lifted clear of the floor.

SUMMARY OF THE INVENTION

The present invention overcomes the above-mentioned disadvantages as well as others inherent in conventional pallets by providing a pallet construction and a lifting fork arrangement which eliminates any projection of the tips of the forks beyond the sides of the pallet. Furthermore, the structural members which make up the pallets are arranged to provide maximum resistance against arching or otherwise flexing when picked up from the ends. According to the present invention, there is provided load carrying apparatus for transport by a vehicle having lifting forks modified to provide a reduced effective length measured from a vertical abutment on the vehicle to outer ends of the forks, and a pallet adapted to be transported by the vehicle with the lifting forks entered below the pallet, said pallet comprising a rectangular base frame and a deck providing the pallet with side edges and end edges, said side edges being spaced apart a distance substantially equal to the effective length of the lifting forks, said base frame having floor contacting members extending in parallel relationship from side edge to side edge one at each end edge and another at the center of the base frame, spacer members longitudinally spaced along each floor member one at each side edge and another at the center of the base frame, longitudinal members mounted upon the spacer members to extend from end edge to end edge one at each side edge and another at the center of the base frame, said deck and base frame defining a pair of longitudinal channels enterable by the lifting forks from either end edge of the pallet, and a pair of transverse channels enterable by the lifting forks from either side edge of the pallet, the effective length of the lifting forks and the side edge to side edge width of the pallet being related so that, when the lifting forks are fully entered into the pair of transverse channels, one side edge is in contact with the vertical abutment and the outer ends of the lifting forks are located within the other side edge.

BRIEF DESCRIPTION OF THE DRAWINGS

Aspects of the invention are illustrated in the drawings in which.

DESCRIPTION OF THE PREFERRED EMBODIMENT

Figure 1:
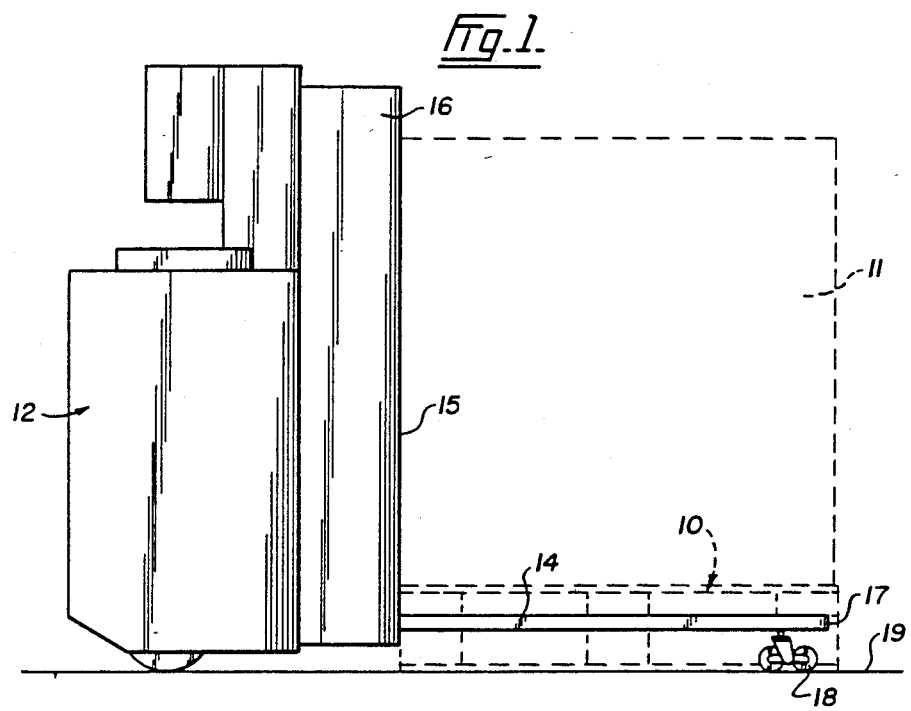
FIG. 1 is a side elevation of apparatus constructed in accordance with the present invention and showing the loaded pallet being picked up by a pallet moving vehicle.

Referring first to FIG. 1 of the drawings, the numeral 10 indicates generally a pallet which is shown, by way of example, being used to support a load of beer cases which are stacked in an oblong pile 11. In brewery warehouses and elsewhere, such a load is shifted about as required by means of a vehicle known as a low lift pallet mover, one of which is generally indicated a 12. This electric powered vehicle is equipped with lifting forks 14 which project forwardly from the vertical front face 15 of a housing 16 carried by the vehicle. The parallel and transversely spaced forks have outer ends 17 and located beneath each fork near the outer ends is a pair of wheels 18 which can ride along the warehouse floor 19 when the pallet mover is picking up or depositing a load.

The cased beer is required to be moved from the warehouse and loaded into freight trucks or railroad cars, both of which offer very confined spaces in which to maneuver the vehicle 12 and stack the palleted loads. This makes it desirable to reduce the area of the load and it has been found that beer cases can be stacked on a pallet measuring 38.5 inches by 48 inches, whereas a standard pallet measures 40 inches by 48 inches. The present pallet is made of this slightly smaller width, and the effective length of the forks, that is, the distance from the front face 15 of the vehicle housing 16 to the outer ends 17 of the forks can be correspondingly reduced. Preferably, the manufactured length of the fork is 38.5 inches, but if the pallet mover or other forklift vehicle is equipped with forks of normal length, then a piece of appropriate size can be cut from the tips of the forks so that these lifting members are preferably 38 inches long. Care should be taken to see that the fork tips 17 are spaced not more than 1.0 inch forward of the extreme front edges of the wheels 18 and this will sometimes mean moving the wheels forward on the underside of the forks to achieve the desired spacing.

Figure 2:
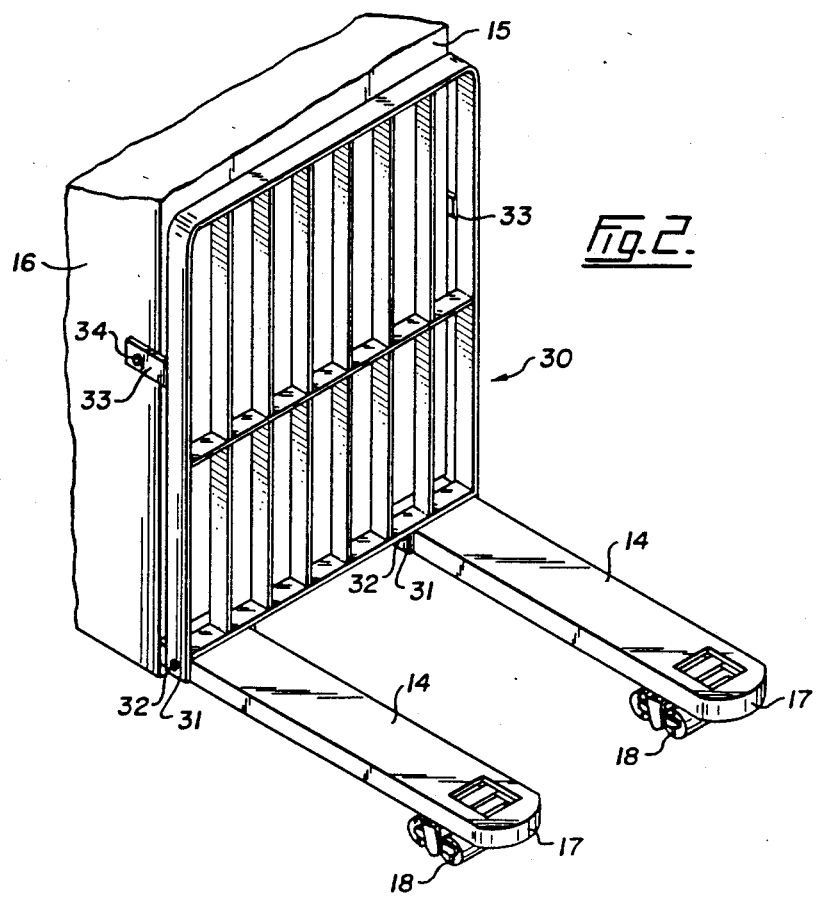
FIG. 2 is a perspective view of a load steadying framework which may be fitted to the vehicle.

For the owner of a vehicle with lifting forks of normal length who does not want to shorten the forks, the present invention contemplates the use of a framework 30, such as is shown in FIG. 2. The open framework generally indicated at 30 is adapted to be mounted on the overlong forks ahead of the housing 16 so as to stand vertically a suitable distance in front of the front face 15. The framework is fitted with depending brackets 31 which straddle the forks 14 and are secured thereto by means of bolts 32. Other rearwardly projecting brackets 33 on the sides of the framework embrace the housing 16 to which they are secured by bolts 34. The placement of the framework is such that the distance from the foremost side of the framework to the tips 17 of the forks then is 38 inches, and the framework also serves to steady a load supporting on the lifting forks. The wheels 18 are shown in their preferred positions, that is, spaced about 1.0 inches from the fork tips.

Figure 3:
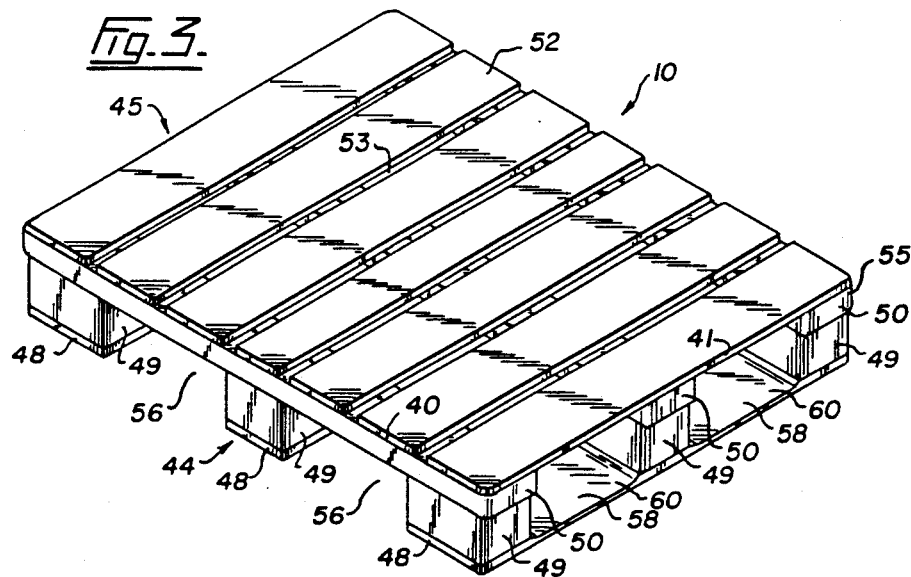
FIG. 3 is a perspective view of the pallet.

Referring now particularly to FIG. 3, the pallet 10 will be seen to be a rectangular structure preferably 48 inches long and 38.5 inches wide with parallel side edges 40 and similarly arranged end edges 41. The pallet is provided with a base frame 44 on which a load carrying platform or deck 45 is mounted. Included in the base frame, are three boards 48 which extend transversely of the pallet, one near each side edge and another board being centrally located exactly midway between the two side edge boards and disposed parallel thereto. Mounted on each of the floor boards 48, are three spacer blocks 49 which are located one at each end of the board and one at the centre. The spacer blocks support structural members commonly referred to as stringers which are indicated at 50. There is a stringer 50 at each side edge 40 of the pallet and another stringer 50 again located centrally therebetween.

The deck 45 is made up of boards 52 which are laid across the stringers so as to extend in parallel relation between the side edges 40 of the pallet. The parallel boards 52 of the load platform are spaced apart to provide gaps 53 between adjacent boards, which gaps can provide hand grips for lifting the pallet should that ever be necessary. At the end edges 41, the spacer blocks and the floor boards are set in beneath the ends of the stringers and the side edges of the end deck boards a distance of 0.5 inches. The end deck boards and the stringer ends are rounded as 55 at the four corners of pallet. This arrangement provides the clearance needed to move the pallet safely past obstructions such as rivets and the like which are often found on walls near floor level in the interior of trucks. The rounded corners 55 reduce contact damage between the walls and pallet.

The several wooden members which make up the pallet 10 are nailed together or are otherwise secured to form a particularly sturdy structure which can withstand heavy loads and the abuse to which it is often subjected. It will be noticed that, by assembling the various members in this manner, the pallet is provided with a pair of transversely extending channels 56 and a pair of longitudinally extending channels 58. The transverse channels 56 which are open at their bottoms can be entered by the forks when the vehicle 12 is approaching the pallet from either side edge 40 and the longitudinal channels 58 which are bounded at their bottom in part by the floor boards 48 are enterable by the forks from either end edge 41. It will be noticed, particularly in FIG. 4, that the edges of the floor boards 48 are rounded or bevelled as at 60 within the channels 48 to allow substantially free passage of the wheels 18 when those wheels are rolled along the floor as the forks are thrust into the longitudinal channels.

Figure 4:
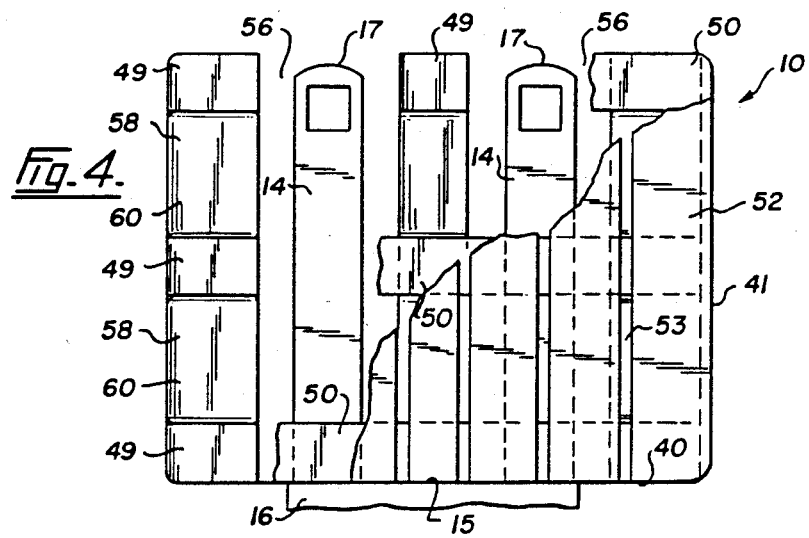
FIG. 4 is a plan view partly broken away, showing the pallet being fitted by forks entered from one side edge.

FIG. 4 shows the position of the forks 14 when entered into the transverse channels 56 to pick up the pallet which may be loaded with a pile 11 of beer cases. One side edge 40 preferably is hard against the face 15 of the housing on the forklift once the outer ends 17 of the forks are either vertically aligned with the opposite side edge 40, or are a very short distance within that edge. The wheels 18 are not obstructed as they roll along the floor 19 to reach this position, and when the forks are raised to lift the load, the upper surface of the forks engage the undersides of all three stringers 50. The loaded pallet is then properly supported, that is, it is steady and the centre of gravity is as near as possible to the machine 12 as is desirable. A pallet constructed and supported in this manner makes the job of loading and unloading freight trucks, for example, relatively easy and the loaded pallets can be stacked hard against one another without damage being inflicted as would be the case if the tips of the forks protruded beyond the edge of the pallet.

Figure 5:
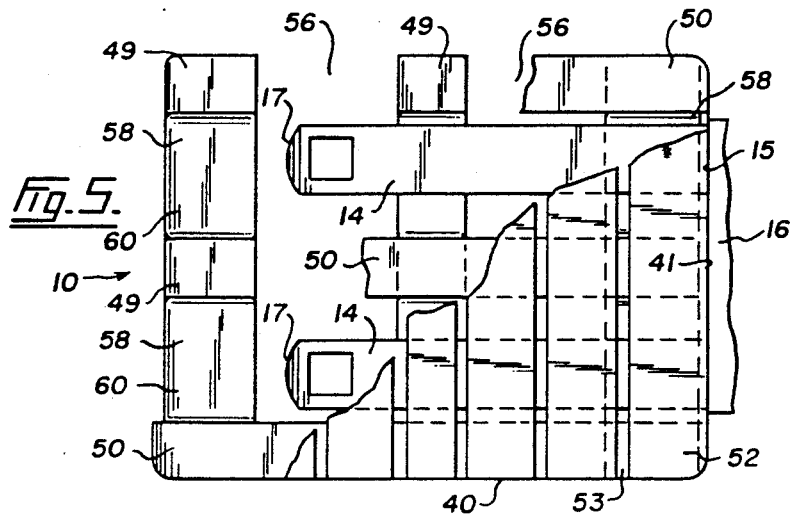
FIG. 5 is a similar view showing the pallet being lifted by forks entered from one end edge.

Referring now to FIG. 5, the forks 14 are shown lodged in the longitudinal channels 58 to pick up a load. One end edge 41 of the pallet abuts the face 15 of the machine and the outer ends 17 of the forks are located near the outermost floor board 48. The loaded pallet may appear slightly overbalanced at this time but it should be noted that the lifting is done when the forks are raised into contact with the undersides of the deck boards 52. The deck boards, are however, supported by the three stringers 50 which are particularly sturdy and have a very high resistance to bending. The beer cases or other load on the platform 45 above the forks counter any tendency of the pallet to tilt forwardly and the structure cannot arch or curve upwardly even though it is cantilevered beyond the tips of the forks. Thus, a pallet constructed in this manner is not distorted or placed under undue strain even when lifted lengthwise by the purposely shortened forks.

From the foregoing, it will be apparent that a pallet constructed as described and used in combination with the shortened lifting forks will facilitate the task of loading freight trucks and the like where space for maneuvering the vehicle and its load is at a premium. The ends of the forks never project beyond the side edges of the pallet so no damage is caused when one loaded pallet is placed alongside another or is lifted away from that position. It will be noticed that, when the forks are within the longitudinal channels, the ends of the forks and the wheels are located in the outermost transverse channel. This correct positioning of the fork ends and the wheels avoids the damage which would occur otherwise if the wheels were allowed to rest in the outermost floor board while the fork ends projected from the side of the pallet. By arranging the stringers so that they extend across the lifting forks rather than parallel thereto as in a conventional pallet, and having the floor and deck boards at right angles to the stringers, a particularly sturdy and long lasting beer skid is obtained.

I claim:

1. A load carrying apparatus for a vehicle equipped with lifting forks projecting horizontally forward from a vertical abutment and having floor-contacting wheels near the outer ends of the lifting forks, said lifting forks being modified to provide a reduced effective length measured from the vertical abutment to outer ends of the forks and to place the foremost edge of the wheels in close proximity to but not projecting beyond the outer ends of the forks, in combination therewith a pallet comprising a rectangular base frame and a deck providing the pallet with side edges and end edges, said side edges being longer than said end edges, said side edges being spaced apart a distance not greater than the effective length of the lifting forks, said base frame having floor contacting members extending parallel to one another from side edge to side edge one at each end edge and another at the center of the base frame, spacer members longitudinally spaced along each floor-contacting member one at each side edge and another at the center of the base frame, longitudinal members mounted upon the spacer members to extend from end edge to end edge one at each side edge and another at the center of the base frame, said deck being constructed of a plurality of deck members extending from side edge to side edge normal to and resting on the longitudinal members, said base frame and deck defining a pair of transverse channels enterable by the lifting forks from either side edge of the platform whereby the forks are raisable into engagement with the undersides of the longitudinal members, and also defining a pair of longitudinal channels enterable by the lifting forks from either end edge of the pallet whereby the forks are raisable into engagement with the undersides of the deck members, the effective length of the lifting forks being no greater than the side edge to side edge width of the pallet so that when the lifting forks are fully entered into the pair of transverse channels, one side edge is in contact with the vertical abutment of the vehicle and the outer ends of the lifting forks are located within the other side edge of the pallet, said lifting forks having upper surfaces which engage the undersides of said three longitudinal members when the lifting forks are in the transverse channels and which entire upper surfaces engage the underside of said deck when the lift forks are in the longitudinal channels, said longitudinal channels being longer than the effective length of the lifting forks.

2. Apparatus as claimed in claim 1, in which said floor-contacting members are shaped within the pair of longitudinal channels to be readily transversed by the floor contacting wheels of the lifting forks when the forks are entering and leaving the channels.

3. Apparatus as claimed in claim 1, in which said pair of transverse channels are spaced apart a distance locating the outer ends of the forks and the floor-contacting wheels within an outermost portion of the transverse channel when the inner side edge of the pallet is in contact with the vertical abutment on the vehicle.

4. Apparatus as claimed in claim 1, and including a load steadying framework, mounting means for securing the framework to the vehicle in a position perpendicular to the lifting forks and spaced a selected distance from the vertical abutment whereby the effective length of the forks is not greater than the overall width of the pallet.

* * * * *